Dec. 1, 1970  D. S. FOSTER  3,543,482

AIR DRIED SYSTEM

Filed May 1, 1967  2 Sheets-Sheet 1

INVENTOR
DANIEL S. FOSTER

BY Whittemore,
Hulbert & Belknap

ATTORNEYS

INVENTOR
DANIEL S. FOSTER
BY
ATTORNEYS

United States Patent Office 3,543,482
Patented Dec. 1, 1970

3,543,482
AIR DRIER SYSTEM
Daniel S. Foster, Grosse Pointe, Mich., assignor to W. D. Gale, Inc., Detroit, Mich., a corporation of Michigan
Filed May 1, 1967, Ser. No. 635,252
Int. Cl. B01d 53/02
U.S. Cl. 55—162       22 Claims

ABSTRACT OF THE DISCLOSURE

A system for eliminating moisture from air in contact with material stored in a tank comprising moisture absorbing means in the path of air entering the tank to replace withdrawn material, and automatic means for regenerating the moisture absorbing means at regular intervals.

BACKGROUND OF THE INVENTION

In the past problems have arisen in connection with storage of certain materials susceptible to deterioration or damage as a result of even small quantities of moisture. A specific example where such difficulties has arisen is in the storage in a generally sealed tank of a hydrocarbon which is periodically withdrawn so as to require an air flow into the tank to replace the material withdrawn. It has been found desirable to provide a system which is fully automatic so that damage to the material may not be caused by inattention on the part of an operator charged with the responsibility of insuring against the entry of moisture.

SUMMARY OF THE INVENTION

In accordance with the present invention, moisture absorbing means, which may conveniently take the form of molecular sieves, is provided in the path of air drawn into the tank or receptacle as a result of withdrawal of material stored in the tank or receptacle. Since molecular sieves become saturated to a point where they no longer perform their function of absorbing or picking moisture from ambient air, it is necessary to replace or regenerate the molecular sieve. Molecular sieves may be regenerated readily by passing dry and preferably warm air through the sieve so as to pick up and extract the moisture molecules absorbed by the sieve.

In accordance with the present invention automatically timed means are operated periodically to cause a reverse flow of perfectly dry air through the molecular sieve so as to regenerate it and the periods of regeneration are automatically provided such that regeneration takes place well before there is any possibility of the sieve or sieves becoming saturated and hence inoperative.

Accordingly, it is an object of the present invention to provide a system capable of insuring against the entry of moisture into a receptacle as air is drawn into the receptacle to replace material withdrawn therefrom.

Other objects and features of the invention will become apparent as the description proceeds, especially when taken in conjunction with the accompanying drawings, illustrating preferred embodiments of the invention.

DESCRIPTION OF THE PREFERRED EMBODIMENTS

Figure 6:
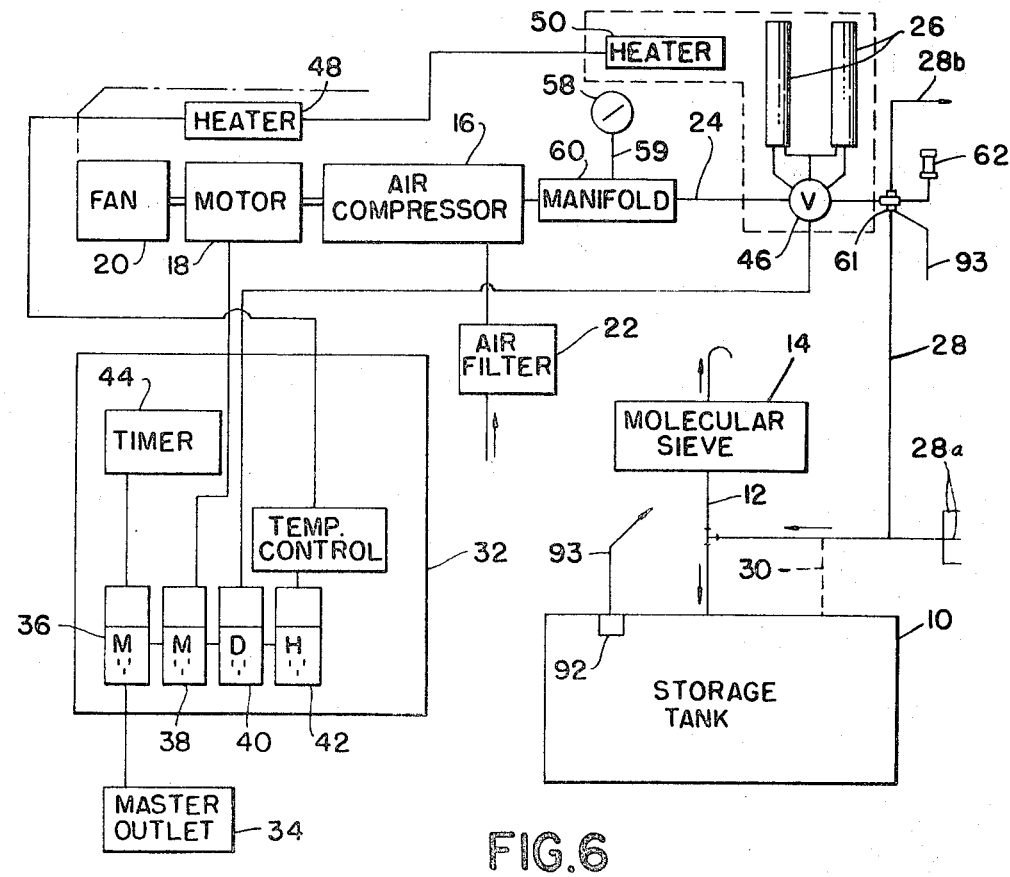
FIG. 6 is a diagrammatic view of the complete system.

Referring first to FIG. 6 there is shown a storage tank 10 which is adapted to store any suitable material but in the present instance is intended for the storage of a material which is harmfully affected by the presence of moisture. The storage tank is of course provided with the usual inlets and outlets for filling the tank with the particular material to be stored, and for withdrawing the material from the tank for use. These inlets and outlets are not illustrated in the diagrammatic view. In addition, the tank 10 is provided with a breather conduit 12 through which atmospheric air may enter as material is withdrawn from the storage tank. In order to insure that any air which is drawn into the storage tank as a replacement for material withdrawn therefrom does not carry moisture with it, the air is caused to traverse a dessicator or moisture pickup means, here illustrated as a molecular sieve. Desiccators using other types of desiccants, such as silica gel, activated alumina, etc., may be used instead of the molecular sieve. Molecular sieves are well known and are commercially available and the construction will not be described in detail. It is sufficient to note however, that molecular sieves remove individual molecules of water from moist air and retain them in or on the sieves. They are effective to perform this function satisfactorily until they have absorbed a predetermined fraction of their total capacity, at which time they become inefficient and permit the passage of moisture into the storage tank 10. However, molecular sieves are further characterized in that when they have become fully charged with water molecules so as to be inefficient, they may be regenerated simply by passing dry and preferably warm air therethrough to remove the water molecules previously picked up by the molecular sieve.

It may in addition be noted that while the molecular sieve is effective, it will exert an additional air drying function on the air contained in the storage tank above the level of the material, ordinarily a liquid, contained therein. Assuming no withdrawal of liquid from the storage tank, there will be over a day a substantial flow of air into and out of the storage tank due to expansion and contraction resulting from temperature differences. Thus, if for any reason moisture is present to some degree in the storage tank it will in part at least be removed as air is expelled during expansion through the molecular sieve and thereafter, upon cooling, replaced by a flow back into the tank through the molecula sieve.

A second effect which may be noted in connection with the molecular sieve is a movement of moisture vapor toward the sieve upon absorption of moisture from ambient air due to reduced vapor pressure. Insofar as the vapor within the tank is concerned this phenomenon is useful in that it will tend to reduce the quantity of moisture vapor which may happen to be present in the air in the tank. However, it has a harmful effect in that even in still air, it tends to continue to withdraw moisture from ambient air outside the tank which as will subsequently appear, may be avoided by providing vapor pressure sealing means between the molecular sieve and atmosphere.

However, it is contemplated that a molecula sieve 14 in conjunction with a particular storage tank in a particular locality, will have a life of measurable duration during which it will not become sufficiently saturated to reduce its efficiency to an unsatisfactory degree. In order to eliminate the necessity of individual attention and consequent failure to remove moisture if the individual charged with the duty of renewing or regenerating the molecular sieve fails in his duty, means are provided for insuring regeneration of the molecular sieve at periodic intervals. In practice, it is found desirable to run the means for passing dry air through the molecular sieve twice a day, and conveniently, it may be run for two hours in the early morning and two hours in the evening. Other programs of course may be substituted dependent upon the circumstances of the installation as well as the convenience of the operators of the system.

The portion of the system for passing dry air through the molecular sieve to effect its regeneration comprises an air compressor 16 operated by a motor 18 which also is connected to a fan 20. Air flows to the compressor through an air filter 22 and compressed air flows through a passenger 24 to valve means which directs the air through one or both of the pair of air driers 26. These driers 26 may be of any type such for example as silica gel absorbers. On the other hand, they may conveniently be in the form of molecular sieves. In any case the air, after it has passed through one or both of the driers, flows through a passage 28 which connects to the breather conduit 12 intermediate the molecular sieve and the storage tank 10. Some of this air may flow into the storage tank but for the most part its effectiveness is exerted by flowing in a reverse direction through the molecular sieve so as to effect its regeneration. It will be understood that instead of connecting to the breather condut 12 as shown, the pasage 28 may connect to the storage tank through an alternate passage 30 herein illustrated in dotted lines. With this arrangement the dry air flows initially into the storage tank and replaces the air in the storage tank so that if for any reason moisture is present in the air above the material stored in the storage tank, this air is first driven out through the molecular sieve, after which the incoming dry air also flows reversely through the molecular sieve effecting its regeneration.

An electrical control panel 32 is provided in association with the apparatus and includes a master outlet 34 which is adapted to be connected to a power source by a conventional electric plug. The master outlet 34 is connected inside a housing, as will subsequently appear, to a main 36, again by a conventional plug-in type connector. The main is electrically connected to outlets 38, 40 and 42, which in turn are adapted to be connected to the electric devices intended for actuation thereby by means of conventional plug-in type connectors. Associated with the main connector 36 is a timer 44 which may include electric clock means to operate the system for intervals of predetermined duration spaced apart as desired. As previously stated, the system may operate by way of a specific example, for two hours in the morning and two hours in the evening, where it is found that the molecular sieve 14 has adequate capacity to insure against it becoming saturated between the regenerating intervals. The outlet 38 is adapted to be connected to the motor. The outlet 40 connects to electrical valve actuating means associated with the valve 46 which controls the passage of air as required through the air driers 26 either in parallel or in series, or through one of the driers alone. In addition, the housing for the operating mechanism including the motor, air compressor, etc. includes electrical heaters designated 48 and 50, which may be enerfiized during the winter to maintain the mechanism in proper operating condition.

Referring now to FIGS. 1-5, the air compressor 16, motor 18, and fan 20 are mounted in a housing 52 and specifically, these elements are supported on a horizontal partition 54 provided in the housing. The air filter 22 is connected to the compressor by a plastic tube 56.

Figure 1:
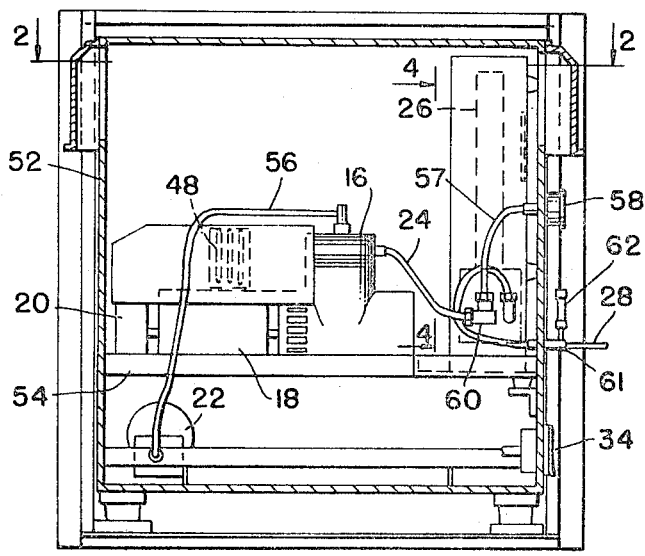
FIG. 1 is a front elevational view of apparatus for providing dry air for the regeneration of an air drier associated with a storage tank.
Figure 3:
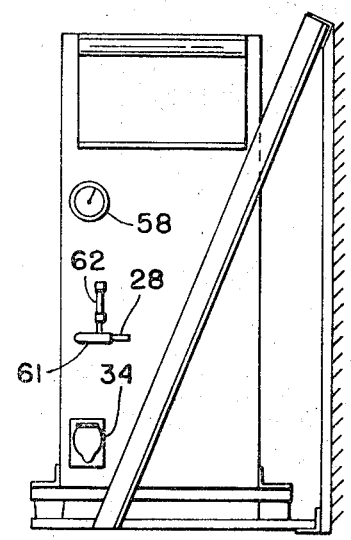
FIG. 3 is an end elevation of the structure shown in FIG. 1.
Figure 2:
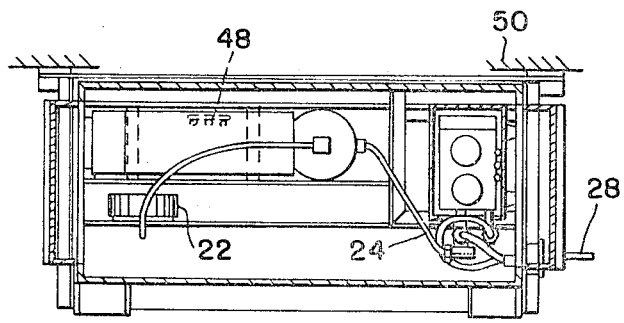
FIG. 2 is a sectional view on the line 2—2, FIG. 1.
Figure 4:
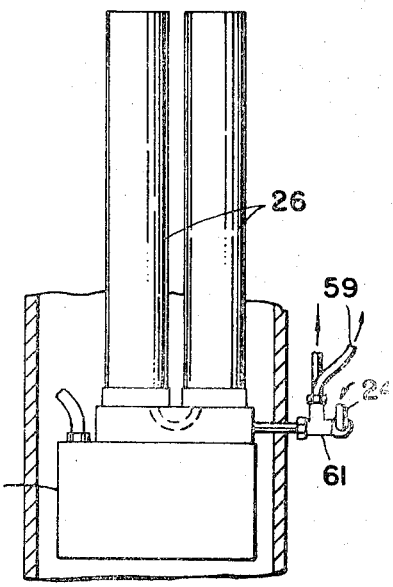
FIG. 4 is an enlarged sectional view on the line 4—4, FIG. 1.
Figure 5:
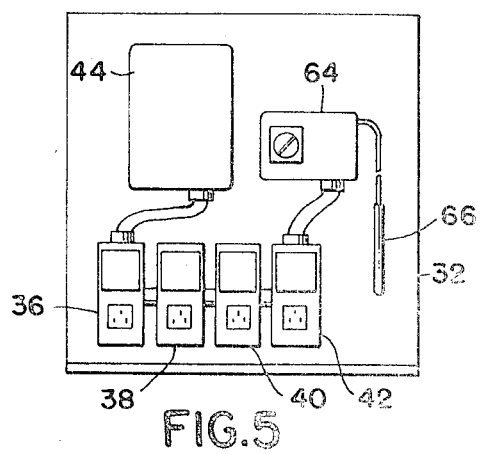
FIG. 5 is an elevational view of an electric panel associated with the mechanism.

The drier assembly comprising the driers 26 previously referred to, is best seen in FIG. 4, and the valve means 46 is physically connected to the driers 26 and includes means (not shown) for selectively connecting the individual driers in series or in paarllel as required. A pressure gauge 58 is suitably connected by a conduit 59 to the manifold or fitting 60 to which the supply conduit 24 from the compressor 16 is connected.

The outlets from the driers 26 are connected to a fitting 61 which in turn is connected to the conduit 28. Moisture sensing means 62 are also provided and are connected to the fitting 61 so as to sense moisture in the air delivered to the molecular sieve 14 and storage tank 10. If desired, the moisture sensing means may comprise a chemical adapted to change color when subjected to moist air.

Control means for the heaters 48 and 50 comprises circuit control means 64 actuated by temperature responsive means 66 which may be positioned to sense ambient temperature.

The wiring panel 32 is actually formed to provide one of the closures for the housing 52. An important advantage of the wiring arrangement is that the electrical connections to the several components of the system are made through ordinary plug connectors and thus, does not require the attention of skilled personnel to effect connection and disconnection of the components.

Figure 7:
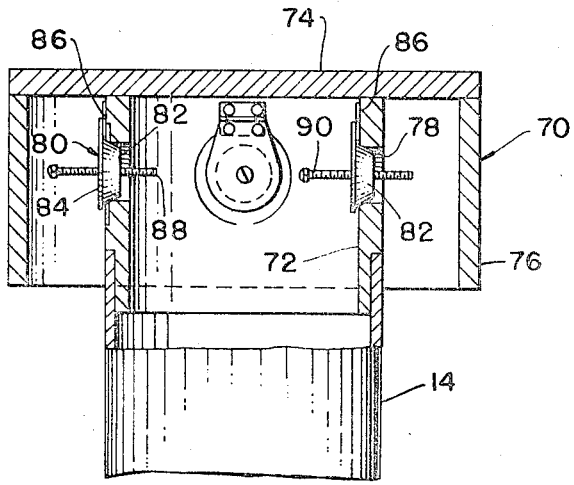
FIG. 7 is a fragmetnary sectional view through a vapor seal used in the system.

Reference was previously made to the fact that due to a reduction in vapour pressure as moisture is absorbed by the desiccant, there will be a tendency for ambient moisture to move toward the desiccant to be absorbed thereby. This would mean that a desiccant such as a molecular sieve, even applied in a storage tank which remained full of material, would eventually become loaded with moisture due to absorption of moisture from outside atmosphere. Accordingly, it is desirable to provide a vapour pressure seal which will be interposed between the desiccant and outside air. Such a construction is illustrated in FIG. 7. In this figure the vapor pressure seal is indicated at 70 and comprises a sleeve 72 adapted to fit with the open top of the molecular sieve or other type desiccator 14. The sleeve is closed at its top by a plate 74 having a depending flange 76 protecting the construction against precipitating or the like.

The sleeve 72 is provided with a plurality of ports or openings 78 and some of these are provided with inwardly opening flow control valves and others are provided with outwardly opening flow control valves. The valve 80 is illustrated as opening outwardly and comprises a valve element 82 formed of rubber or the like carried by a plate 84 which is hinged as indicated at 86 to the outer surface of the sleeve 72. Associated with the valve 80 is an adjustable weight comprising a screw 88 having a nut 90 threaded thereto. Movement of the nut 90 along the screw or movement of the screw itself may affect the closing effect of the weight constituted by the nut and screw and thus determine the internal pressure at which the valve opens to permit escape of air from the desiccator such as occurs upon filling the tank.

At the right of FIG. 7 there is illustrated an identical valve 82 except that in this case it is supported by a hinge 86 located at the inside of the sleeve and thus the valve 82 is adapted to open to permit outside atmospheric air to flow into the sleeve and through the desiccator into the tank, an effect which is produced when the fuel or other material is withdrawn from the storage tank.

The present consrucion provides full protection for the flow control valves and permits them to be adjusted so as to open at very small pressure differences between internal and external pressure.

In FIG. 6 there has been illustrated a simplified system in which means are provided for supplying dried air to a desiccator such for example as the moisture sieve 14. It will of course be appreciated that the capacity of the air drier may be such as to be capable of supplying sufficient dry air through the passage 28 to dry a relatively large number of desiccators 14. Thus for example, in tank farms where a large number of tanks are to be equipped with air drier systems as disclosed herein, each of the outlet conduits 28 may be connected by branch lines designated 28A in FIG. 6, so that a plurality of desiccators may be reactivated simultaneously.

Reference was previously made to the completely automatic cycling of the system and this may again be provided where a single air drier is used to supply dry air for reactivating a much greater number of desiccators. In this case the automatic cycling may for example supply dry air for reactivation of a given number of desiccators for a predetermined period sufficient to insure complete reactivation of all desiccators, after which by conventional timing and switch apparatus, the dried air may be supplied to a second main line 28b which may in turn supply air through a number of branches similar to the branches 28a. With this arrangement a single air drier system including all of the structure shown in FIG. 6 with the exception of the storage tank and desiccator, may be used at full capacity to operate substantially continuously to provide the regeneration of a relatively large number of desiccators.

While, as previously indicated, the simplest operation of the system is on a time basis so that each desiccator will be subjected to reactivation at relatively preset intervals, it is of course within the contemplation of the present invention that means responsive to moisture sensing means located in the conventional storage tanks may be employed to activate valves effective to supply dried air to reactivate the desiccator of any storage tank in which an excess of moisture is noted.

While the means for accomplishing the foregoing constitutes known components, the apparatus is diagrammatically suggested in FIG. 6 by showing a moisture sensing unit 92 having a suitable electrical output connection indicated at 93 which may be connected with the control valve 61 as indicated in the figure, and effective to control the valve 61 or such other valves as may be required to supply dried air to the desiccant 14.

An important feature of the system as described above is that although the time required for regeneration of the molecular sieve 14 may be substantial, as for example four hours out of a total of 24 hours a day, this regeneration is accomplished without interfering with the normal usage of the tank 10 and permits continued withdrawal of material therefrom as required. While operation of the air compressor to deliver dry air to the passage interconnecting the molecular sieve and storage tank, or alternatively, directly to the storage tank, interrupts inflow of air through the breather passage, this does not prevent normal usage of the storage tank. As material is withdrawn from the storage tank it is replaced by dry air which has passed through the air driers 26 and normally, this inflow of dry air will be sufficient to continue to maintain a reverse flow of dry air through the molecular sieve so as to continue its regeneration even during periods when material is being withdrawn from the storage tank.

The drawings and the foregoing specification constitute a description of the improved air drier system in such full, clear, concise and exact terms as to enable any person skilled in the art to practice the invention, the scope of which is indicated by the appended claims.

What I claim as my invention is:

1. A storage system for a material adversely affected by moisture comprising a storage receptacle from which the material is drawn, a breather passage through which atmospheric air flows to replace material withdrawn from the receptacle, moisture take-up means in the breather passage effective to remove moisture from air flowing into said receptacle, said moisture take-up means being of a type having a useful life of known duration under given operating conditions and being capable of regeneration, regeneration means for regenerating the moisture take-up means while said storage receptacle remains in service including a connection for admitting dry air to both said storage receptacle and said moisture take-up means and automatic control means for actuating the regenerating means for a period sufficient to regenerate said moisture take-up means at intervals sufficiently shorter than the known useful life of said moisture take-up means to insure continuous effective moisture removal while the system is in use.

2. A system as defined in claim 1 in which said moisture take-up means comprises moisture sieve means.

3. A system as defined in claim 1 in which said regenerating means comprises means for drying air and means for directing dry air through the moisture take-up means in a direction opposite to flow of atmospheric air into said receptacle through said moisture take-up means to regenerate it by removing moisture therefrom.

4. A system as defined in claim 3 in which said moisture take-up means comprises moisture sieve means.

5. A system as defined in claim 3 in which said regenerating means comprises a connection for admitting dry air to the breather passage intermediate said moisture take-up means and said receptacle.

6. A system as defined in claim 3 in which said regenerating means comprises a connection for admitting dry air to said receptacle to replace air therein and to cause a reversal flow of dry air through said breather passage to regenerate said moisture take-up means.

7. A system as defined in claim 3, said regenerating means comprising a compressor, a motor connected to drive said compressor, an air drier, and passage means connecting said compressor through said air drier to said moisture take-up means.

8. A system as defined in claim 7 comprising a timer for actuating said motor at predetermined intervals for predetermined periods.

9. A system as defined in claim 8 comprising a moisture indicator to indicate the condition of air delivered from said drier.

10. A system for preventing the entry of moisture into a storage tank and for removing moisture therefrom in which the storage tank has a breather passage connecting its interior to atmosphere, said system comprising moisture take-up means connected in the breather passage effective to remove moisture from air flowing into said storage tank, said moisture take-up means being of a type having a useful life of known duration under given operating conditions and being capable of regeneration, regeneration means for regenerating the moisture take-up means while said storage tank remains in service including a connection for admitting dry air to both said storage tank and said moisture take-up means and automatic control means for actuating the regenerating means for a period sufficient to regenerate said moisture take-up means at intervals sufficiently shorter than the known useful life of said moisture take-up means to insure continuous effective moisture removal while the system is in use.

11. A system as defined in claim 10 in which said moisture take-up means comprises moisture sieve means.

12. A system as defined in claim 11 in which said regenerating means comprises means for drying air and means for directing dry air through the moisture take-up means in a direction opposite to flow of atmospheric air into said tank through said moisture take-up means to regenerate it by removing moisture therefrom.

13. A system as defined in claim 12, said regenerating means comprising a compressor, a motor connected to drive said compressor, an air drier, and passage means connecting said compressor through said air drier to said moisture take-up means, a housing for said compressor, motor and air drier, and an electric connection for said motor comprising a detachable plug connection.

14. A system as defined in claim 10, said regenerating means comprising a compressor, a motor connected to drive said compressor, an air drier, a timer for energizing and de-energizing said motor in accordance with a daily program, a housing for said motor, compressor, air drier and timer, an external electrical connector on said housing including a plug-in fixture, and internal electrical connectors within said housing connecting said timer and said motor to said external connector, each of said internal electrical connectors comprising separate plug-in fixtures.

15. A storage system for a material adversely affected by moisture comprising a storage receptacle from which the material is drawn, a breather passage through which atmospheric air flows to replace material withdrawn from the receptacle, moisture take-up means in the breather passage effective to remove moisture from air flowing into said receptacle, said moisture take-up means being of a type capable of regeneration after it has become ineffective as a result of having taken up a quantity of moisture determined by its capacity, and regeneration means including a connection for admitting dry air to both said storage receptacle and said moisture take-up means, said regeneration means being operable while the moisture take-up means remains in operation in its installed position to regenerate said moisture take-up means.

16. A system as defined in claim 15 in which said regeneration means comprises means for supplying substantially dry air into the system intermediate the moisture take-up means and the body of material in said receptacle to cause reverse flow of dry air past said moisture take-up means.

17. A system as defined in claim 16 comprising timing means for activating said regeneration means at predetermined intervals.

18. A system as defined in claim 16 comprising means responsive to the presence of moisture in said receptacle for activating said regeneration means.

19. A system as defined in claim 16 comprising means for connecting said supply of dry air to a plurality of receptacles.

20. A system as defined in claim 19 comprising timing means for connecting said supply of dry air sequentially to separate groups of receptacles.

21. A system as defined in claim 16 comprising a vapor pressure barrier between said moisture take-up means and outside atmosphere.

22. A system as defined in claim 21 in which said barrier comprises inwardly and outwardly check valves, and adjustable means for biasing said valves lightly into closed position.

References Cited
UNITED STATES PATENTS

| | | | |
|---|---|---|---|
| 2,340,898 | 2/1944 | Race | 55—189 |
| 2,584,889 | 2/1952 | Latour | 55—387 |
| 2,783,547 | 3/1957 | Bieger et al. | 55—162 |
| 2,976,950 | 3/1961 | Smith | 55—30 |
| 3,320,724 | 5/1967 | Rice | 55—33 |
| 3,468,103 | 9/1969 | Hergt | 55—33 |

REUBEN FRIEDMAN, Primary Examiner

C. N. HART, Assistant Examiner

U.S. Cl. X.R.

55—179